United States Patent [19]

Schumacher et al.

[11] Patent Number: 5,057,232

[45] Date of Patent: Oct. 15, 1991

[54] FILTER ELEMENT AND METHOD OF FILTRATION

[75] Inventors: Ivo Schumacher, Jona, Switzerland; Werner Stahl, Landau, Fed. Rep. of Germany; Walter Stocker; Patrick A. Müller, both of Stäfa, Switzerland

[73] Assignee: DrM, Dr.Müller AG, Männedorf, Switzerland

[21] Appl. No.: 459,783

[22] PCT Filed: May 11, 1989

[86] PCT No.: PCT/CH89/00085

§ 371 Date: Jan. 24, 1990

§ 102(e) Date: Jan. 24, 1990

[87] PCT Pub. No.: WO89/11322

PCT Pub. Date: Nov. 30, 1989

[30] Foreign Application Priority Data

May 24, 1988 [CH] Switzerland ............... 1952/88

[51] Int. Cl.⁵ .................. B01D 29/33; B01D 29/52
[52] U.S. Cl. ........................... 210/806; 210/340; 210/345; 210/499; 55/525

[58] Field of Search ............ 210/341, 345, 347, 437, 210/438, 460, 461, 462, 497.01, 497.2, 509, 510, 767, 806, 499; 55/505, 525, 527, 529, DIG. 45, DIG. 31

[56] References Cited

U.S. PATENT DOCUMENTS

| 2,606,628 | 8/1952 | Hasselwander | 210/438 |
| 2,886,180 | 5/1959 | Morgan et al. | 210/438 |
| 3,023,905 | 3/1962 | McDougal et al. | 210/438 |
| 3,536,200 | 10/1970 | Gigliatti et al. | 210/438 |
| 4,544,483 | 10/1985 | Aruai | 210/438 |
| 4,814,078 | 3/1989 | Stern et al. | 210/438 |

Primary Examiner—Robert A. Dawson
Assistant Examiner—Wanda L. Millard
Attorney, Agent, or Firm—Michael J. Striker

[57] ABSTRACT

The filter element for use in a container includes a central pipe (2) closed along its length and also provided with an opening at a lower end thereof; a cylinder surrounding this central pipe in a concentric manner and having a closable lower end, the closable lower end of the cylinder projecting beyond the lower end of the central pipe and being provided with a base; and at least two cylindrical filter means (1), which are arranged radially and symmetrically with respect to the cylinder and which communicate with the cylinder, and a group of connecting pipes, each of the cylindrical filter means being connected by one of the pipes with the cylinder.

6 Claims, 2 Drawing Sheets

FILTER ELEMENT AND METHOD OF FILTRATION

BACKGROUND OF THE INVENTION

The present invention is directed to a filter element for use in a container with a central pipe which is closed along its length and provided with a lower opening, as well as to a method of filtration.

A filter element comprising a central pipe for draining off a filtrate, which central pipe is closed along its entire length and is only open at the top and bottom, is known from CH-A-631 352. The known filter element is suitable for a filtration for separating fine particles from a suspension and for a residual volume filtration, but does not satisfy the imposed requirements under extreme conditions in which filtration which is free of foreign matter is required. In this case, foreign matter is understood to mean the finest particles which can be disengaged, e.g., from multiple-filament woven textile filters and which must be removed, e.g. in the production of serum.

Filter cartridges which are woven from monofilament, particularly metal wire, are known per se. However, they have the disadvantage that dynamic cleaning is not possible with them, and an attached filter cake can therefore be removed only with great difficulty and incompletely. The woven wire fabrics are rigid and are permeable to air to a relatively great degree. In order to detach a dry filter cake and subsequently discharge it from a filter container, greater quantities of gas in sudden bursts are required than is the case when using textile filter.

SUMMARY OF THE INVENTION

It is the object of the invention to provide a filter element, which has the characteristics of rigid monofilament filter means, but nevertheless allows a simple and complete removal of a filter cake.

Another object of the invention is a method of filtration with such a filter element.

The object is met, by a structure in which the central pipe is concentrically enclosed by a cylinder whose bottom part can be closed.

The central pipe has a relatively small cross-section compared to the cylinder surrounding it. The two pipes are arranged coaxially. This arrangement enables a separate path for the filtrate and a separate path for the gas used to remove the filter cake. This has the advantage that a much greater quantity of gas can be made available for brief periods than is possible by a known back-flushing via the filtrate line.

According to a preferred construction, the cylinder for the air feed projects out over the length of the central pipe and forms a more or less semicircular base or space in its lower part. But the base can also be flat.

For constructions which can be sterilized, an additional filter means is provided at the lowest point of the base for the condensate run-off. This additional filter means may be a plate of filter material.

The filter plate advisably comprises the same filter means as are used for filtration, particularly a sintered metal which is welded into the base.

The cylinder enclosing the central pipe communicates via pipes with the interior of the filter means, which preferably consist of tubular filter elements of woven wire. The object of the pipes is to guide off the filtrate in an unimpeded manner during the filtration and to let through large quantities of air in short periods of time during the removal of a filter cake. These pipes can also be arranged one above the other and can connect filter means with the cylinder, which filter means enclose the central pipe.

It is advisable to arrange the collecting pipe above the compressed gas distributor pipe for draining off the filtrate.

Metal woven fabrics have proven advantageous as filter means for filtration which is free of foreign matter. However, chemically and thermally resistant monofilament of plastic can also be used instead of the metal woven fabrics. Sintered-metal or sintered-ceramic cartridges can also be used.

The invention both as to its construction so to its mode of operation, together with additional objects and advantages thereof, will be best understood from the following detailed description of the preferred embodiments with reference to the accompanying the drawing.

DETAILED DESCRIPTION OF PREFERRED EMBODIMENTS

Figure 1:
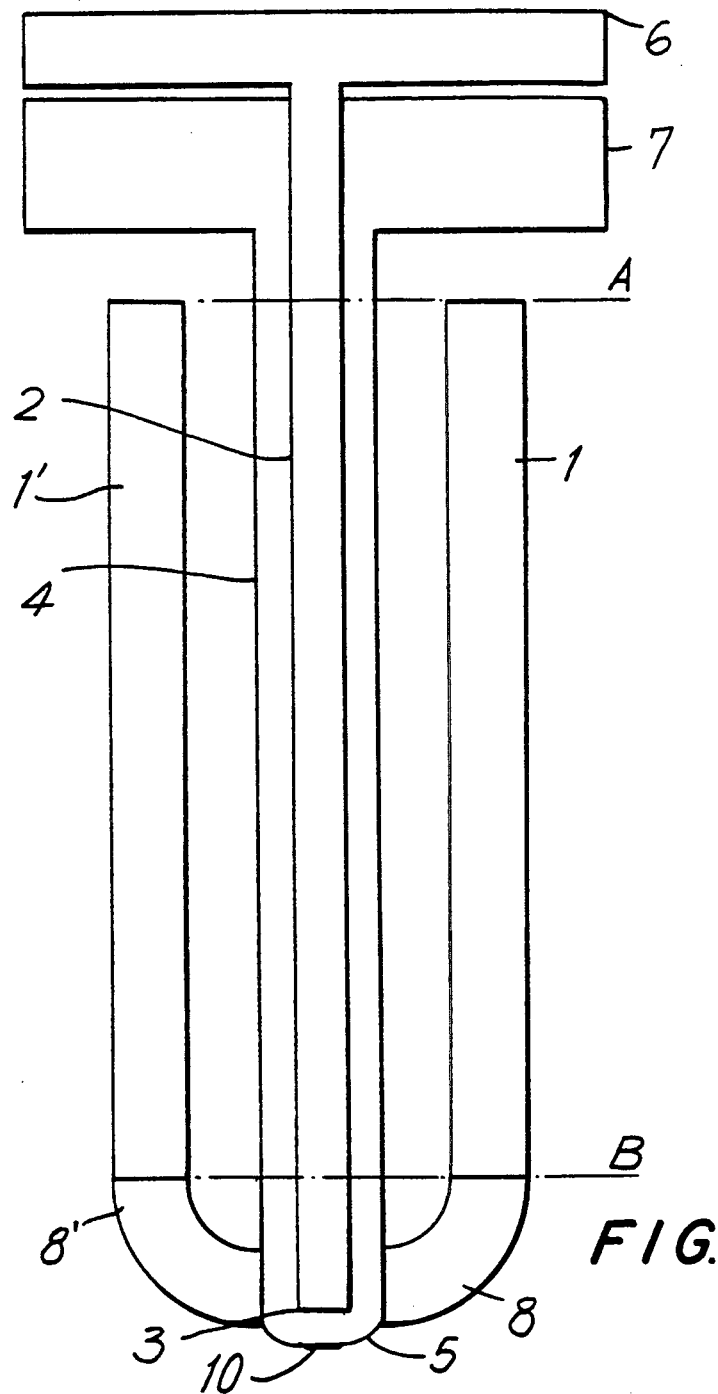
FIG. 1 shows a longitudinal elevational view of a filter element according to the invention.

Filter means are designated by 1, 1' in FIG. 1. The filter means 1, 1' are arranged radially around a central pipe 2 with a lower opening 3 and a cylinder 4 with a base 5. The central pipe 2 is connected with a collecting pipe 6 and the cylinder 4 is connected with a compressed gas distributor pipe 7. As a rule, the central pipe 2 and the collecting pipe 6, as well as the cylinder 4 and the compressed gas distributor pipe 7, form an integral unit. The filter means 1, 1', which comprise e.g. metal woven fabric cylinders, are closed at their upper opening A and are connected with the cylinder 4 at their lower opening B via pipes 8, 8'. Filter means 10 are arranged in the lower part of the cylinder 4.

Figure 2:
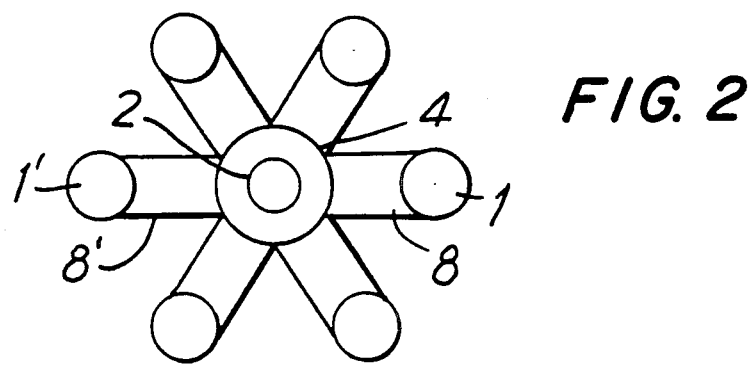
FIG. 2 shows a cross-sectional view of the filter element shown in FIG. 1.

In FIG. 2, six identical filter means 1 and 1', respectively, are arranged in radial symmetry around the cylinder 4 and are connected with one another via the pipes 8, 8'.

Figure 3:
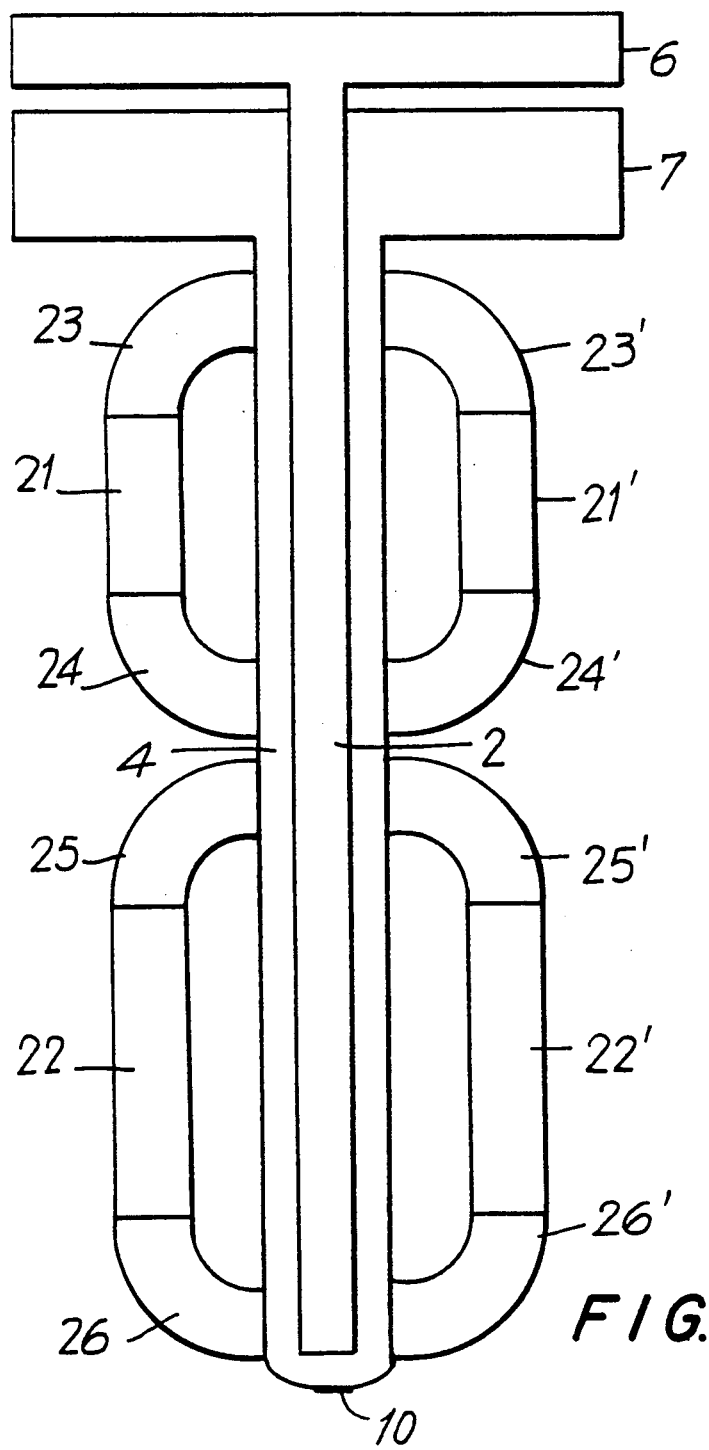
FIG. 3 shows a longitudinal elevational view of another embodiment of a filter element according to the invention.

In FIG. 3, filter pipes 21, 21' and 22, 22' are connected with the cylinder 4 in a tiered manner. This variant is advisable if the filter means are very highly permeable to air, and the air quantity required for cleaning is no longer sufficient. Depending on criteria relating to method technology, filter pipes and filter means of desired number and desired length can be provided. The diameter of the central pipe 2 and cylinder 4 is also a function of the overall surface area and constitution of the filter means as well as of the media to be filtered.

Figure 4:
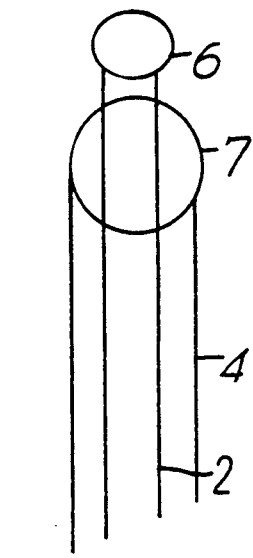
FIG. 4 shows a longitudinal side view of the upper portion of the filter element according to FIG. 3.

FIG. 4 shows the arrangement of the central pipe 2 located in the cylinder 4 in the upper portion of the filter cartridge. In this case, the collecting pipe 6 is arranged above the compressed gas distributor pipe 7.

The filter elements, according to the invention, are fastened in a known manner in a container, not shown, above the collecting pipe 6 for a filtrate and the compressed gas distributor pipe 7. The turbid material which is to be filtrated and which contains solids is introduced into this container e.g. under pressure. In operation, during the filtration, the filtrate passes through the filter means 1, 1'. The clear filtrate flows through the pipes 8, 8' into the base 5 of the cylinder 4 and, from the latter, through the lower opening 3 of the central pipe 4 into the collecting pipe 6, at which location it leaves the filter container. After the filtration is terminated, the liquid is removed from the interior of the filter element in the filtration direction with compressed gas. In order to remove the filter cake, which has been dried preliminarily in this way, e.g. compressed air or an inert gas is fed via the compressed gas distributor pipe 7 and the filter cake is accordingly loosened from the filter means 1, 1'.

In order to sterilize a cleaned filter element, the condensate formed during sterilization with steam is removed via additional filter means 10.

However, the functions of the central pipe 2 and the cylinder 4 can also be reversed. In such a variant, the gas feed is effected via a central pipe 2 of large dimensions, which central pipe 2 communicates with the filter means 1 via pipes 8. The filtrate feed is then effected through the annulus between the central pipe 2 and the cylinder 4.

Instead of two pipes located one inside the other, the central pipe 2 and the cylinder 4 can also be arranged adjacent to one another. In this case, there is a connection between the gas feed pipe and the filtrate drain pipe.

The principle of the separate pipes is also applicable for use with filter cloths or diaphragms.

The filter element, according to the invention, is simple in terms of construction and is accordingly an economical means for dry extraction of a filter cake, the removal of which requires brief or sudden bursts of larger quantities of gas. The filter element has proven successful particularly in separating out very fine materials (migration free filtration).

While the invention has been illustrated and described as embodied in a filter element and a method of filtration with use of the filter element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Filter element for use in a container, comprising a central pipe (2) extending over a length and having a lower end, said central pipe being closed along said length and also being provided with an opening at said lower end; and a cylinder surrounding said central pipe in a concentric manner and having a closable lower end, said closable lower end of said cylinder projecting beyond said lower end of said central pipe and being provided with a base; at least two cylindrical filter means (1) which are arranged radially and symmetrically with respect to said cylinder, and a plurality of pipes, each of said cylindrical filter means being connected by one of said pipes with said cylinder so as to communicate therewith.

2. Filter element according to claim 1, wherein the cylindrical filter means comprise monofilament woven material.

3. Filter element according to claim 2, wherein the monofilament woven material comprises metal.

4. Filter element according to claim 1, further comprising an additional filter means (1) provided in the base (5) of the cylinder (4).

5. Filter element according to claim 1, further comprising a collecting pipe (6) communicating with said central pipe and a compressed gas distributor pipe (7) communicating with said cylinder and arranged beneath said collecting pipe.

6. A method of filtration comprising the steps of providing a filter element comprising a central pipe (2) having a length and a lower end, said central pipe being closed along said length and also being provided with an opening at said lower end, and a cylinder surrounding said central pipe in a concentric manner and having a closable lower end, said closable lower end of said cylinder projecting beyond said lower end of said central pipe and being provided with a base, and at least two cylindrical filter means (1) which are arranged radially and symmetrically with respect to said cylindrical, and a plurality of pipes, each of said cylindrical filter means being connected to said cylinder by one of said pipes; and directing a flow of medium through said cylindrical filter means and further through said cylinder and said central pipe, a collecting pipe communicating with said central pipe.

* * * * *